(No Model.)
C. H. MUCKENHIRN.
WATER CLOSET.
No. 488,363. Patented Dec. 20, 1892.
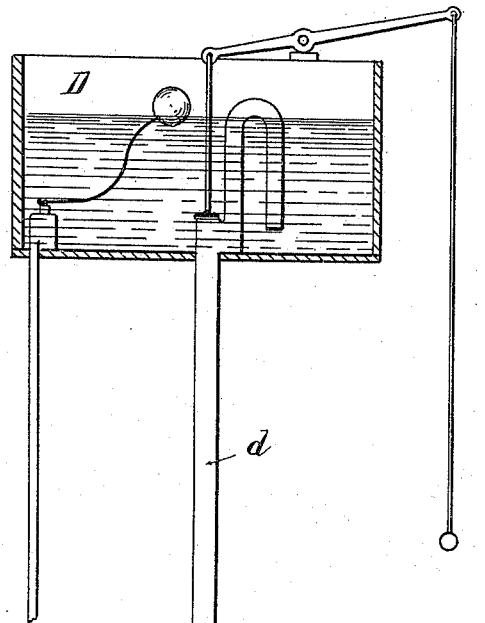
Fig. 1.
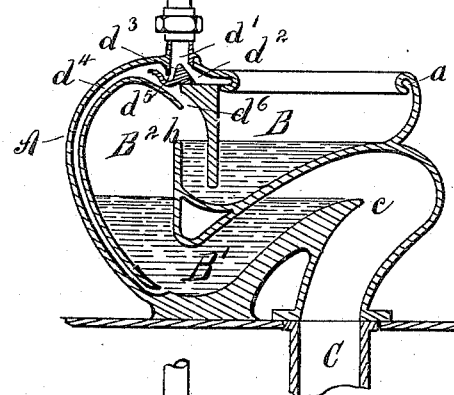
Fig. 2.
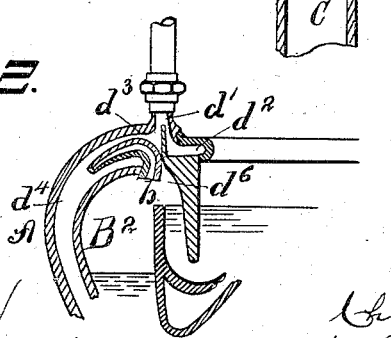
WITNESSES
L. W. Bradford
F. Clough
INVENTOR
Charles H. Muckenhirn
by Parker & Burton
Attorneys.

UNITED STATES PATENT OFFICE.

CHARLES H. MUCKENHIRN, OF DETROIT, MICHIGAN.

WATER-CLOSET.

SPECIFICATION forming part of Letters Patent No. 488,363, dated December 20, 1892.

Application filed February 4, 1892. Serial No. 420,303. (No model.)

*To all whom it may concern:*

Be it known that I, CHARLES H. MUCKENHIRN, a citizen of the United States, residing at Detroit, county of Wayne, State of Michigan, have invented a certain new and useful Improvement in Water-Closets; and I declare the following to be a full, clear, and exact description of the invention, such as will enable others skilled in the art to which it pertains to make and use the same, reference being had to the accompanying drawings, which form a part of this specification.

My invention relates to water closets, and has for its object the provision of means for removing the foul air from between the traps in a double trap closet. Efforts were made prior to my invention to accomplish this result by causing a flow of water through a conduit in the rear of the bowl, and having an opening into the air chamber between the traps, from the conduit; the supposition being that the flow of water would siphon out the foul air. But such efforts have been unavailing, as a solid flow of water in a pipe of uniform size will not take to itself air with which it comes in contact, sufficient to accomplish the result, and, consequently, the foul air has remained undisturbed by the flow of water. In these prior efforts, the conduit has been made of a uniform size throughout, and effort made to induce the air to enter with the water. I have found the result is much different where the flowing water is broken up or sprayed, or where a stream of a certain size is passed into a conduit of a larger size, and air admitted to the larger pipe. In case of the spray, the air mingles with the water and is carried with it. In carrying this principle into operation, I employ the conduit back of the bowl, as heretofore, and divide it into two sections, the first near the point of entry of the water from the tank, and the second of larger size, making room for the water and such air as is caused to mingle with it. To further aid in accomplishing the purpose, I make the outlet of the first portion of such form as to produce a spray and cause the water to enter the enlarged portion of the conduit in a spray. An opening is left in the walls of the conduit, where the water is sprayed into the larger section, so that the air from the closet is allowed to mingle freely with the spray. In this manner, I succeed in clearing the closet of the foul air, which is carried away with the water.

In the drawings, Figure 1 is a vertical section, showing the closet and tank. Fig. 2 is a view showing the use of a small conduit or pipe entering a larger one, and arranged with its discharge end in line with the movement of the water.

In the drawings, A is the body of the bowl.

B, B', are the two water seals; and $B^2$, the air space between the water seals.

C is the discharge pipe from the closet, the water overflowing into this discharge over the ledge $c$ from the water seal B', and flowing over the partition $b$ into the water seal B' from the seal B.

D is the water tank provided with the usual valves for automatically filling the tank, and for flushing.

$d$ is the pipe leading from the tank to the closet, the water, when flushing, passing around the edges of the bowl through the conduit $a$, and delivered into the water seal B, as is usual in such constructions. The water passing through the pipe $d$ is divided by the partition or wedge $d'$. This wedge forms two passages, one to the right, $d^2$, into the closet, and one, $d^3$, into the conduit $d^4$. This conduit $d^3$ is made in the form of a trap to provide a water seal at $d^5$, and is so shaped as to deliver the water against the upper wall of the conduit $d^4$ and convey the flow of water into a spray. The conduit $d^4$ I make larger than the conduit $d^3$, so that the water when formed in a spray at this point, may pass through the conduit $d^4$ still in the form of a spray. An opening is made from the air chamber $B^2$ into the conduit $d^4$ at $d^6$, through which the air may pass from the chamber $B^2$, and mingle with the water in the spray as it passes through the conduit $d^4$.

In the construction shown in Fig. 2, a suction pipe is led from the upper portion of the air space $B^2$ through the dividing wall and extended back and down in line with the flow of the water, its end being provided with a contracted discharge nozzle. This pipe is arranged centrally in the channel $d^4$ so that the water will completely surround the nozzle and as it passes down will create a suction, drawing the air from chamber $B^2$. By this form the water is prevented from backing into space $B^2$. The conduit $d^4$ in both constructions leads down and into the bottom of the water seal $B'$. When the tank is flushed, the water flows from the seal B into $B'$, and overflows it over the ledge $c$, and causes a flow of water, which carries with it the mingled air and water from the conduit $d^4$.

I am aware that the conduit $d^4$ has been employed, and that the water has been thrown into this conduit in a manner similar to that shown in this application, except that no provision has been made for spraying water, and no difference in size provided between the conduits $d^4$ and $d^3$. The construction in which this difference in size was omitted was thoroughly tried and found to fail to produce the result desired, while the construction and the proportions shown by me have been found to produce the result. While the form using the spray is preferred by me, the variation shown may be employed.

What I claim is—

1. In a water closet the combination with the bowl having a dead air space—and a discharge conduit communicating with the air space, of a water supply conduit entering the discharge conduit of a diameter less than the smallest diameter of the discharge conduit and means at the end of the supply for spraying the water into the discharge conduit substantially as described.

2. In a water closet the combination with a bowl having a dead air space and a discharge conduit having communication with the upper end of the air space, of a water supply conduit entering the discharge conduit, and a curved deflector at the end of the water supply in the discharge conduit, substantially as described.

In testimony whereof I sign this specification in the presence of two witnesses.

CHARLES H. MUCKENHIRN.

Witnesses:
 L. S. BACON,
 REEVE LEWIS.